United States Patent [19]
Hammond, Jr. et al.

[11] Patent Number: 5,613,073
[45] Date of Patent: Mar. 18, 1997

[54] APPARATUS AND METHOD FOR A BUFFER RESERVATION SYSTEM

[75] Inventors: William A. Hammond, Jr.; Ross E. Johnson, both of Rochester; George W. Nation, Eyota, all of Minn.

[73] Assignee: International Business Machines Corporation, Armonk, N.Y.

[21] Appl. No.: 280,102

[22] Filed: Jul. 25, 1994

[51] Int. Cl.$^6$ .............................. G06F 13/00; G06F 13/18; G06F 12/00

[52] U.S. Cl. .......................... 395/250; 395/478; 395/472; 370/455

[58] Field of Search .................................. 395/250, 325, 395/425, 478, 472; 370/85.4

[56] References Cited

U.S. PATENT DOCUMENTS

| | | | |
|---|---|---|---|
| 4,709,364 | 11/1987 | Hasegawa et al. | 370/85.4 |
| 4,736,368 | 4/1988 | Szczepanek | 370/85.5 |
| 4,819,229 | 4/1989 | Pritty et al. | 370/85.5 |
| 4,866,704 | 9/1989 | Bergman | 370/85.4 |
| 4,932,023 | 6/1990 | Geyer et al. | 370/85.4 |
| 4,953,157 | 8/1990 | Franklin et al. | 370/60 |
| 5,173,898 | 12/1992 | Heinzmann et al. | 370/94.1 |
| 5,185,737 | 2/1993 | Nassehi et al. | 370/85.8 |
| 5,193,090 | 3/1993 | Filipiak et al. | 370/94.1 |
| 5,216,670 | 6/1993 | Ofek et al. | 370/85.14 |
| 5,229,993 | 7/1993 | Foudriat et al. | 370/85.3 |
| 5,235,595 | 8/1993 | O'Dowd | 370/94.1 |
| 5,245,605 | 9/1993 | Ofek | 370/85.12 |
| 5,276,682 | 1/1994 | Van As et al. | 370/85.5 |
| 5,351,043 | 9/1994 | Hullett et al. | 340/825.5 |

OTHER PUBLICATIONS

Stallings, "Data and Computer Communications", 1991, pp. 378–381, and 395–396.

Cidon et al., "MetaRing A Full–Duplex Ring with Fairness and Spatial Reuse", IEEE 1993.

IBM Technical Disclosure Bulletin, vol. 34, No. 10B, Mar. 1992, "Medium Access Control Protocol for Ring and Bus Networks Based On Reservation and Deferment Providing Throughput–Fairness Control and Tight Access–Delay Bounds", P470–475.

IBM Technical Disclosure Bulletin, vol. 36, No. 08, Aug. 1993, "Fast Fairness Scheduling for a Reservation–Based Media Access Control Protocol", pp. 293–299.

IBM Patent Application RO993–022, Serial No. 08/165,283, filed Dec. 1993, "A Method and System for Transmitting Data Packets In a Distributed Data Processing System".

*Primary Examiner*—William M. Treat
*Assistant Examiner*—Kenneth R. Coulter
*Attorney, Agent, or Firm*—Owen J. Gamon

[57] ABSTRACT

An apparatus and method in a data processing system for sending a data packet from a source node to a destination node. The data processing system includes a multi-segment network having at least two segments, wherein the source node and the destination node are located within different segments. Communication of a data packet from one segment to another segment is provided by an agent node. When a receiving node, which may be either an agent or a destination node, cannot accept a packet, it places a reservation tag of "A" or "B" in an echo packet. The retried packet then uses this reservation tag to gain priority for any available buffers in the agent or destination node. The receiving node toggles between accepting all the outstanding "A" packets (when the receiving node is in the "receiving A" state) and accepting all the outstanding "B" packets (when the receiving node is in the "receiving B" state) assuming that the receiving node has a free, unoccupied buffer for accepting the packet. The receiving node counts the number of outstanding "A" reservations and the number of outstanding "B" reservations. Any time the number of available buffers is greater than the number of outstanding "A" packets (when the receiving node is in the receiving "A" state) any "new" packets or "B" packets will be accepted. Analogously, any time the number of available buffers is greater than the number of outstanding "B" packets (when the receiving node is in the receiving "B" state) any "new" packets or "A" packets will be accepted.

11 Claims, 11 Drawing Sheets

APPARATUS AND METHOD FOR A BUFFER RESERVATION SYSTEM

FIELD OF THE INVENTION

The present invention relates generally to an improved distributed data processing system in particular to improved communication within a data processing system such as a multi-segment local area network. Still more particularly, the present invention relates to communication between nodes located in different segments in a multi-segment local area network.

BACKGROUND OF THE INVENTION

Data processing systems in the form of computer networks are increasingly common in the modern workplace. Such networks typically include multiple workstations and host or server devices that may be distributed over a vast geographical distance. Such networks contain nodes; each node includes a communications control unit, which is a unit that controls the transmission and reception of data in a network. The communications control unit may contain one or more ports. The node may also be a processing element, such as a workstation or a personal computer. A processing element may include one or more processors and memory. The communications control unit for the node may be included in the processing element.

Many different topologies exist for connecting multiple computers into a distributed data processing system. One common technique for interconnecting multiple computers within a data processing system is to arrange the nodes in a ring structure. One known ring system is the SCI (Scalable Coherent Interface) network, defined by the standard I.E.E.E. 1596-1992 (hereinafter SCI standard), well known to those of ordinary skill in the art, which specifies that nodes in a network communicate via unidirectional rings. Data is passed from one node to another node around the ring from its source address to its destination address in units called packets. The source address is the node that originates the packet and the destination address is the node that is to receive the packet.

As the size of a computer network increases, multiple inter-connected rings may be employed so that the bandwidth of a single ring does not create a bottleneck in communications within the network. The multiple rings in the network are interconnected via special nodes called agent nodes, also called bridges or switches. Data packets that need to travel from the source address across multiple rings to reach a destination address are transferred by an agent node from one ring in the network to another ring in the network. The communications control unit in an agent node has two or more ports in order to connect to two or more rings.

Under the SCI standard, any time a packet is successfully received by a destination node or an agent node, the receiving node places an echo packet onto the ring as an indication to the source node that the packet does not have to be re-transmitted onto that ring. As a result, ownership or responsibility for a packet is transferred from node to node. If the receiving node is an agent node, it assumes the responsibility for ensuring that the packet is sent to the next node. Only agent nodes and destination nodes send echo packets, not other intermediate nodes.

For the nodes in a network that conform to the SCI standard, the source node transmits a packet without knowing whether the destination node will have a buffer available to accept a packet. When a destination node or agent node cannot accept a packet, it sends a busy echo back to the sender, which may be a source or an agent node; the source or agent node must retry the transmission later. When the agent or destination node sends a non-busy echo back to the sender, this non-busy echo indicates that the destination node successfully accepted the packet.

Using this buffering design, it is possible for a forward progress problem to occur by a sending node always receiving a busy echo for its packets. This problem can occur if other sending nodes are sending packets to the same destination node or through the same agent node, and they happen to always be first with their packets The SCI standard solution to this problem is a buffer reservation system. When a destination or agent node returns a busy echo, it places a reservation tag of "A" or "B" in the echo packet. When the sending node, which may be a source or agent node, retries this packet, it includes this reservation tag in the packet, which instructs the destination or agent node to give this packet priority for the available buffers. The destination or agent node alternates between accepting the outstanding "A" packets and accepting the outstanding "B" packets. While accepting "A" packets, those new packets that cannot be accepted are given a busy echo with a "B" reservation tag. Once all the "A" packets are accepted, then "B" packets are accepted and the destination node responds to those new packets that cannot be accepted with a busy echo that has an "A" reservation tag. The destination or agent node does not keep track of how many "A" or "B" reservation tag packets are outstanding; instead, a stitch (time-out) mechanism is used to deduce that, for example, no more "A" packets are outstanding.

To guarantee fair access to destination node buffers, no single sending node should be allowed to flood a single destination node with new packets and demand that each packet be given a reservation tag. To address this fair access problem, some prior art buffering systems, which did not have agents connecting multiple rings, have used a Demand Reservation Rule that states "no given sending node, at a given time, may demand more than one reservation from any given receiving node."

This Demand Reservation Rule does not work for SCI standard because the SCI standard allows the use of agents. Because SCI topologies consist of multiple rings connected via agents, packets transmitted by a single source node destined for a number of destination nodes may be funneled through a single agent node on the source node's ring. An SCI source node is not aware that its packets are being funneled through an agent node, and an agent node can send an echo packet with a reservation back to the source node without the source node realizing that the reservation came from the agent node and not the destination node. Thus, a source node would demand more than one reservation from one agent node (which would violate the Demand Reservation Rule) without realizing it. Due to this limitation, the SCI standard uses a modified version of the Demand Reservation Rule that further restricts a sending node to demanding only one reservation at any given time, regardless of the distribution of packet destinations.

The SCI standard reservation system works well when the design of the communications control unit includes very few, such as one or two, receiving buffers. However, packet throughput and latency (the time to deliver a packet from the source node to the destination node) are impacted when the last few "A" (or "B") packets are outstanding and more buffers are available than there are "A" (or "B") packets. The destination node will continue to reject new packets and any "B" (or "A") packets with a busy echo until the very last "A" (or "B") packet is accepted even though the destination node has excess buffers available. Thus, when the receiving node has a large number of buffers, the SCI standard reservation system causes the buffers to be under utilized. The impact to throughput of rejecting packets, which must then be retransmitted, can be significant when the communications control unit design includes four, eight or more buffers. As the desire for speed grows, designers of communications control units would like to increase the number of buffers, yet the prior art control units are not able to effectively take full advantage of a large number of buffers.

For the foregoing reasons, there is a need for a communications control unit which guarantees fair access to receiving node buffers yet still allows new and "A" packets to be received when in the "receiving B" state, and still allows new and "B" packets to be received when in the "receiving A" state.

SUMMARY OF THE INVENTION

It is an object of the present invention to provide an enhanced method and apparatus for communicating within a network.

It is an object of this invention to provide an enhanced method and apparatus for communication between nodes located in different segments in a multi-segment local area network.

The foregoing and other objects are achieved as is now described. The present invention provides an apparatus and method in a data processing system for sending a data packet from a source node to a destination node. The data processing system includes a multi-segment network having at least two segments, wherein the source node and the destination node are located within different segments. Communication of a data packet from one segment to another segment is provided by an agent node.

When a receiving node, which may be either an agent or a destination node, cannot accept a packet, it places a reservation tag (also called a token, label, or priority) of "A" or "B" in the echo packet. The retried packet then uses this reservation tag to gain priority for any available buffers in the agent or destination node. The receiving node alternates between accepting all the outstanding "A" packets (when the receiving node is in the "receiving A" state) and accepting all the outstanding "B" packets (when the receiving node is in the "receiving B" state) assuming that the receiving node has a free, unoccupied buffer for accepting the packet.

The receiving node counts the number of outstanding "A" reservations and the number of outstanding "B" reservations. Any time the number of available buffers is greater than the number of outstanding "A" packets (when the receiving node is in the receiving "A" state) any "new" packets or "B" packets will be accepted. Analogously, any time the number of available buffers is greater than the number of outstanding "B" packets (when the receiving node is in the receiving "B" state) any "new" packets or "A" packets will be accepted.

DETAILED DESCRIPTION OF PREFERRED EMBODIMENT

Figure 1:
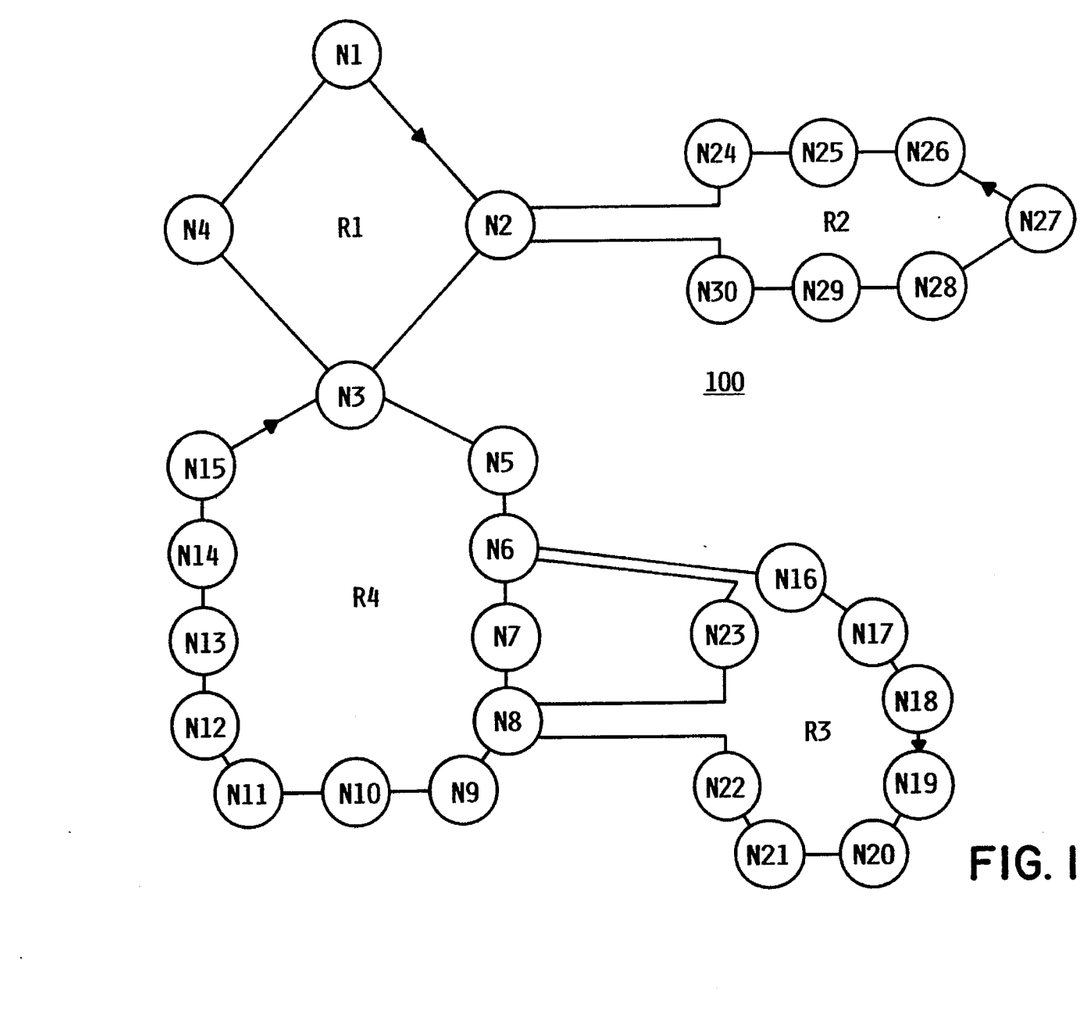
FIG. 1 shows a block diagram of a data processing system configured as an interconnected ring in which an embodiment of the present invention may be implemented.

Referring to FIG. 1, a block diagram of interconnected ring network 100 in which a preferred embodiment of the present invention may be implemented is illustrated. Interconnected ring network 100 includes rings R1, R2, R3, and R4. Interconnected ring network 100 contains 30 nodes, N1–N30. Nodes N2, N3, N6, and N8 act as agent nodes in interconnected ring network 100. Rings R1–R4 in interconnected ring 100 are unidirectional rings and are also referred to as segments within interconnected ring network 100.

Figure 2:
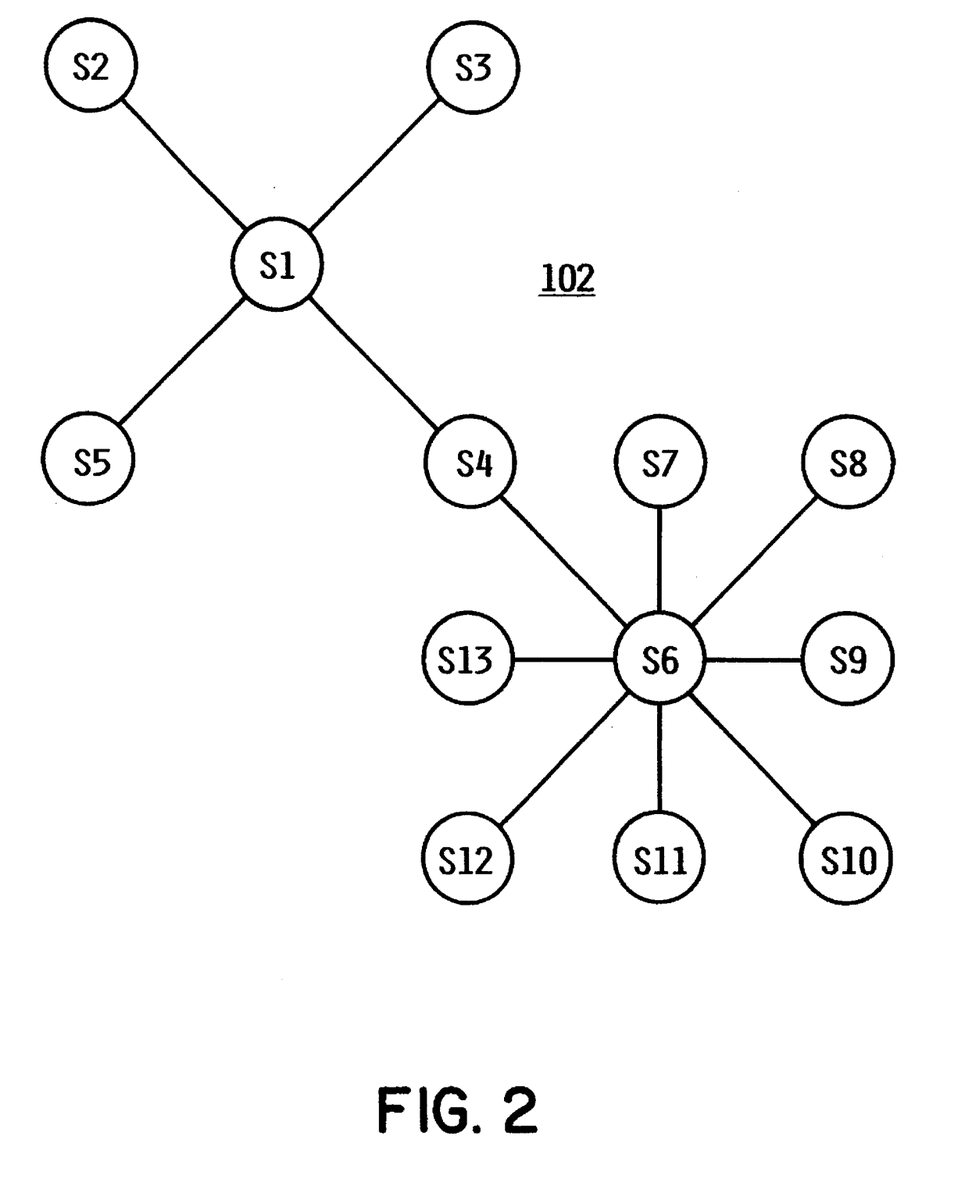
FIG. 2 shows a block diagram of a data processing system configured as a star network in which an embodiment of the present invention may be implemented.

Referring to FIG. 2, a block diagram of a star network is depicted in which a preferred embodiment of the present invention also may be implemented. Star network 102 includes nodes S1–S13, which form segments within star network 102. Nodes S1 and S6 act as agent nodes to provide agent functions between various segments in this network configuration.

Figure 3:
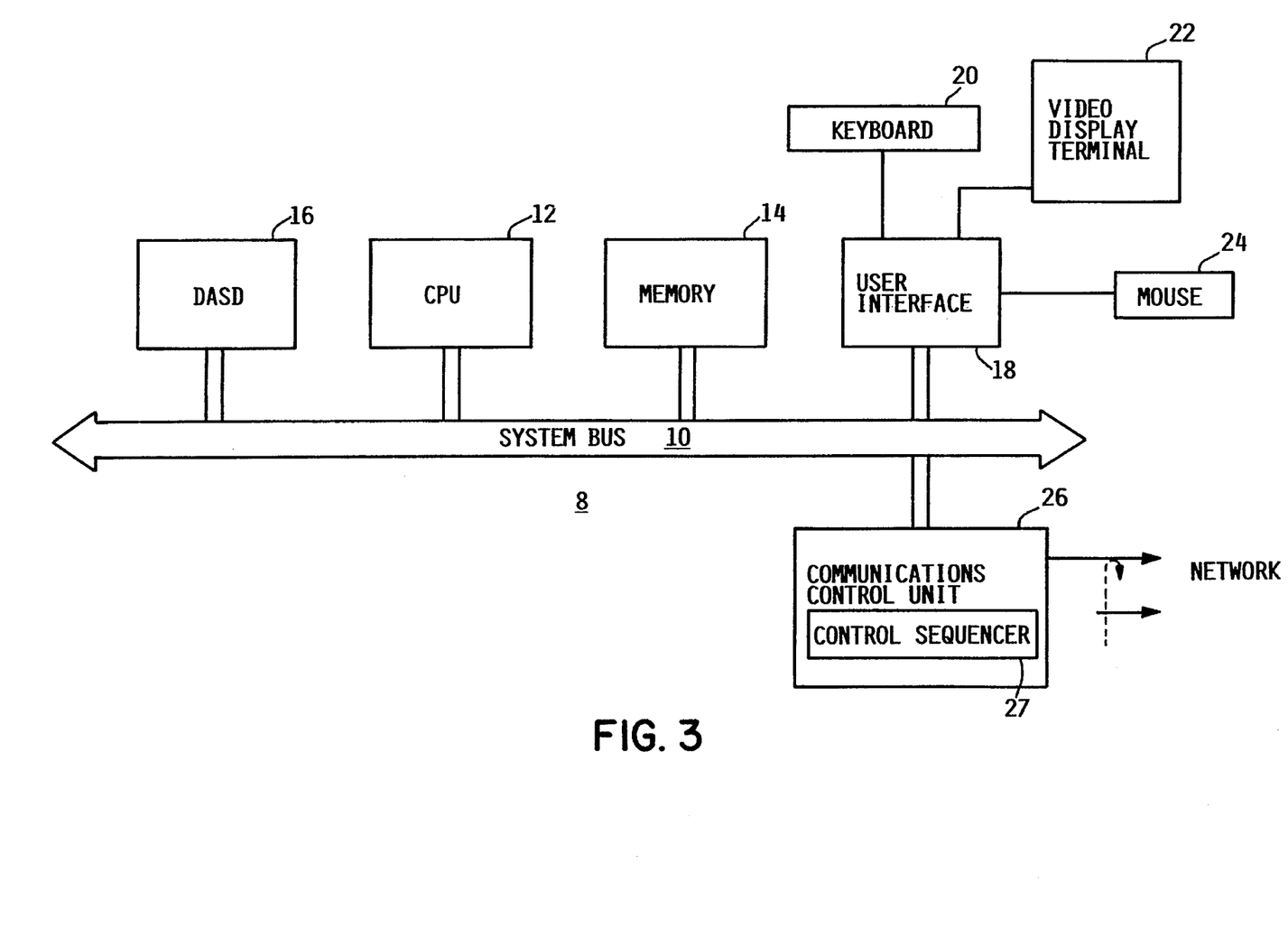
FIG. 3 shows a block diagram of an example of a data processing system, which may be utilized as a node in a network in accordance with a preferred embodiment of the present invention.

Referring to FIG. 3, a block diagram of data processing system 8, which may be utilized as a node in a network such as ring network 100 or star network 102, is illustrated in accordance with a prefected embodiment of the present invention. System bus 10 provides a connection between various components with data processing system 8. Central Processing Unit (CPU) 12 provides the decision making capability in data processing system 8. CPU 12 may include one or more processors, such as an 80486 processor available from Intel Corporation. Memory 14 provides storage for data processing system 8 and may include both read only memory (ROM) and random access memory (RAM). Direct access storage device (DASD) 16 provides additional storage for data processing system 8. DASD 16 typically provides long term storage for data processing system 8. DASD 16 may include, for example, a hard disk drive and/or a floppy disk drive.

User interface 18 provides an interface between data processing system 8 and peripherals employed by a user to interact with data processing system 8. User interface 18 may include various adapters and drivers for driving peripherals, such as keyboard 20, video display terminal 22, and mouse 24.

Communications control unit 26 provides the interface between data processing system 8 and the network to which it is connected. Communications control unit 26 may include a number of different ports, 1 to N. Communications control unit 26 also contains control sequencer 27. Control sequencer 27 comprises a plurality of logic gates that carry out this invention as described in more detail in the flowcharts and state diagrams of FIGS. 4–11 and to handle communications activities, for example receiving packets, examining packets, and/or transmitting packets within a network. In another embodiment (not shown), the communications control unit includes a processor, memory, and a control sequencer that comprises a plurality of machine instructions that execute on the processor to carry out this invention as described in more detail in the flowcharts and state diagrams of FIGS. 4–11.

Typically, data processing system 8 will include a single port that is connected to the network. When data processing system 8 is employed as an agent node, communications unit 26 will include two or more ports to provide connections to different ports or segments of the network.

The operation of the preferred embodiment, as shown in the flowcharts and state diagrams of FIGS. 4–11 will now be described in more detail.

Figure 4:
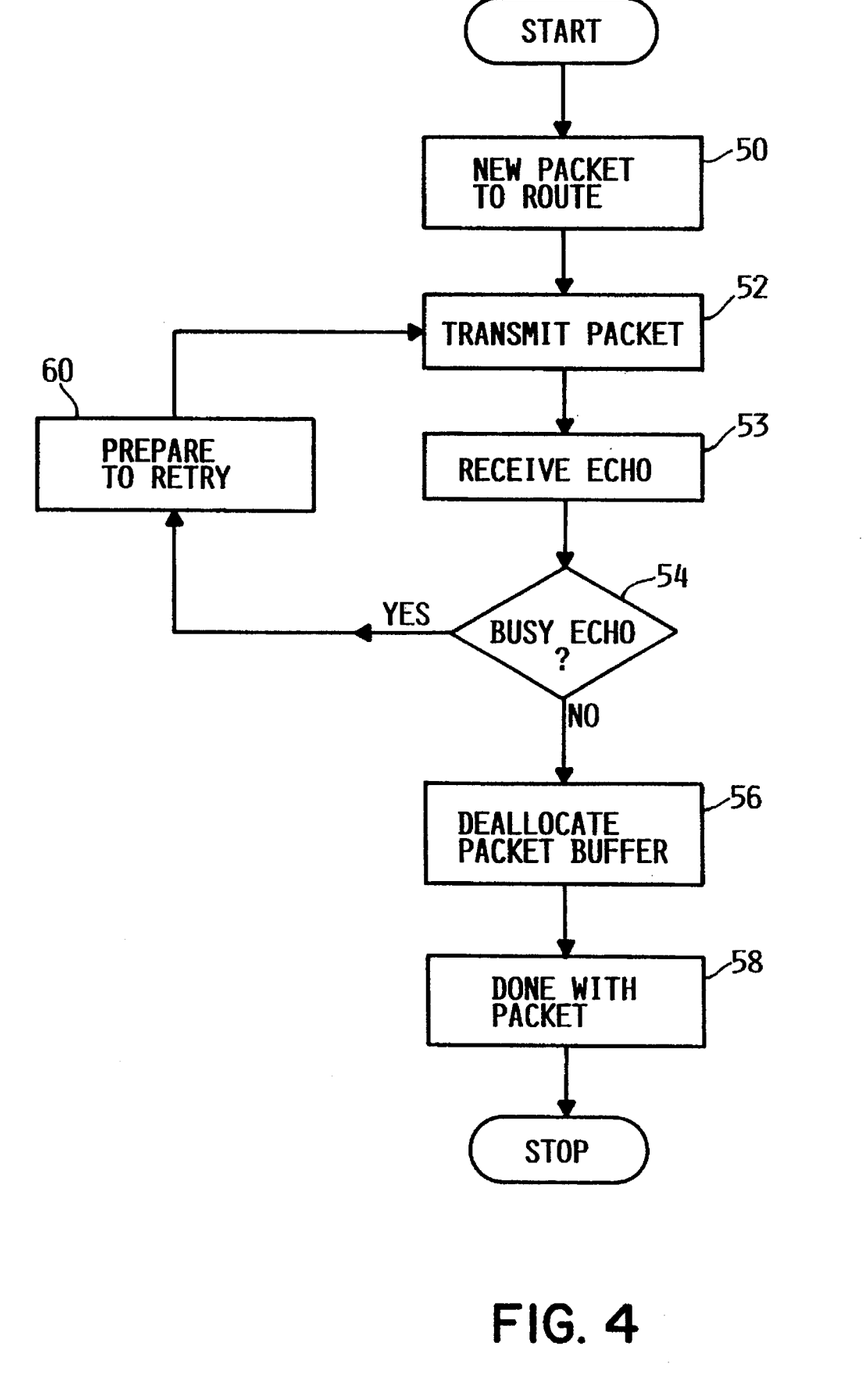
FIG. 4 shows a flowchart that depicts the operation of a control sequencer that is controlling a communications control unit of a source node.

FIG. 4 shows a flowchart of a routine in communications control unit 26 that sends data packets from a source node in a network. As shown in block 50, control sequencer 27 obtains a data packet for transmission within the network. In block 52, control sequencer 27 sends the data packet. In block 52, control sequencer 27 waits to receive an echo for the data packet. When the echo is received at block 53, control sequencer 27 checks at block 54 if the echo indicates that the receiving node (the agent or destination node) is busy and thus is unable to accept the packet. If the echo is a busy echo, control sequencer 27 prepares to retry the transmission at block 60 and then retries the transmission at block 52. If the echo at block 54 was not a busy echo, the control sequencer 27 deallocates the data packet buffer at block 56 and concludes processing for the sending of the packet at block 58.

Figure 5:
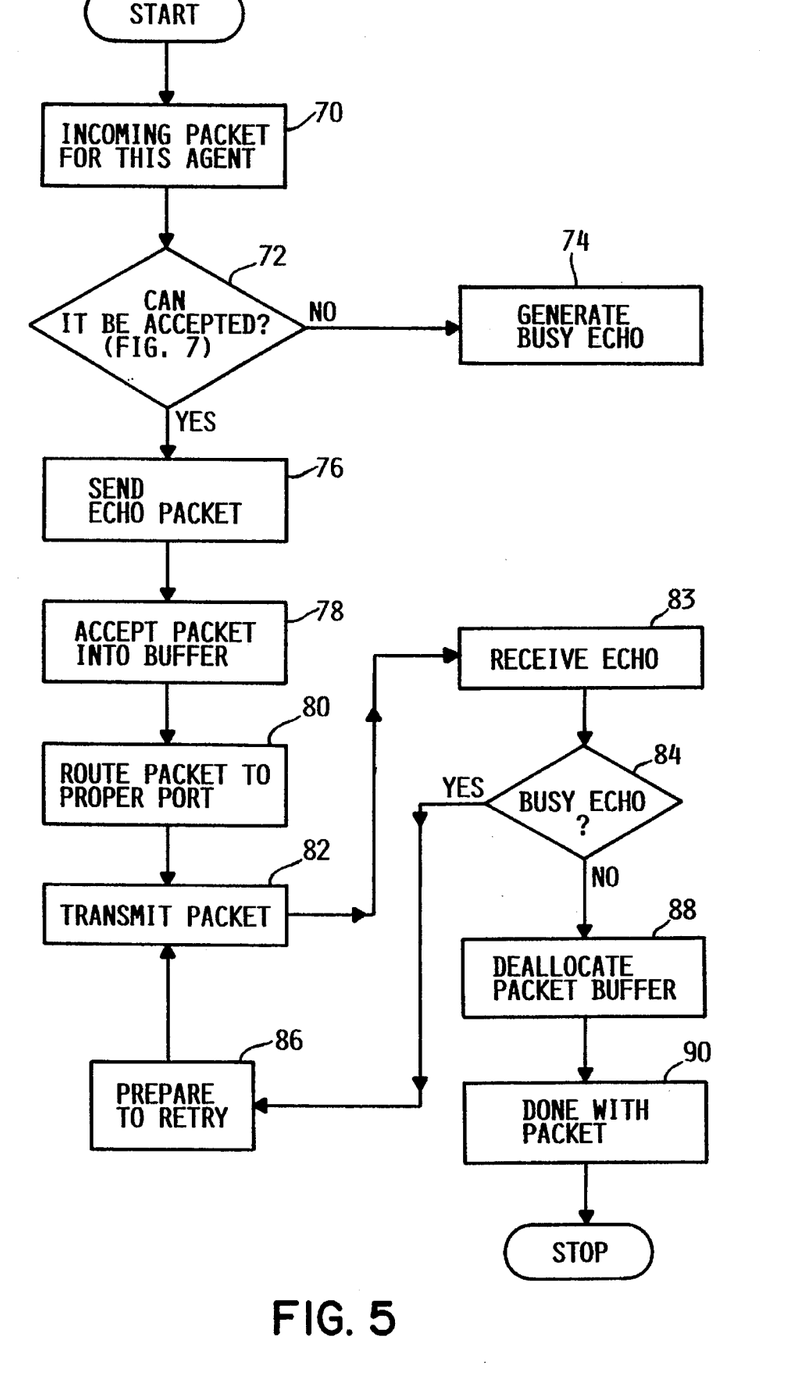
FIG. 5 shows a flowchart that depicts the operation of a control sequencer that is controlling a communications control unit of an agent node.

FIG. 5 shows a flowchart of a routine in communications control unit 26 that receives data packets into an agent node in a network. Control sequencer 27 detects an incoming data packet at block 70. At block 72, control sequencer 27 checks whether this data packet can be accepted into a buffer. The check shown in block 72 is performed by control sequencer 27 as further described in FIG. 7. If the incoming data packet cannot be accepted, control sequencer 27 generates a busy echo that is returned to the source node at block 74. If the incoming data packet can be accepted, control sequencer 27 generates a non-busy echo that is returned to the source node at block 76. Control sequencer 27 executing at the source node receives these echoes as shown at block 53 of FIG. 4.

Control sequencer 27 accepts the data packet into a free buffer at block 78 and routes the packet to the proper port for re-transmission at block 80. At block 82, control sequencer 27 transmits the packet across the network to the appropriate destination node. When the echo is received from the destination node at block 83, control sequencer 27 checks whether the echo is a busy echo at block 84. If the echo is a busy echo, control sequencer 27 prepares to retry the transmission at block 86 and re-transmits the packet at block 82. If the echo was not a busy echo, control sequencer 27 deallocates the packet buffer at block 88 and completes processing for this data packet at block 90.

Figure 6:
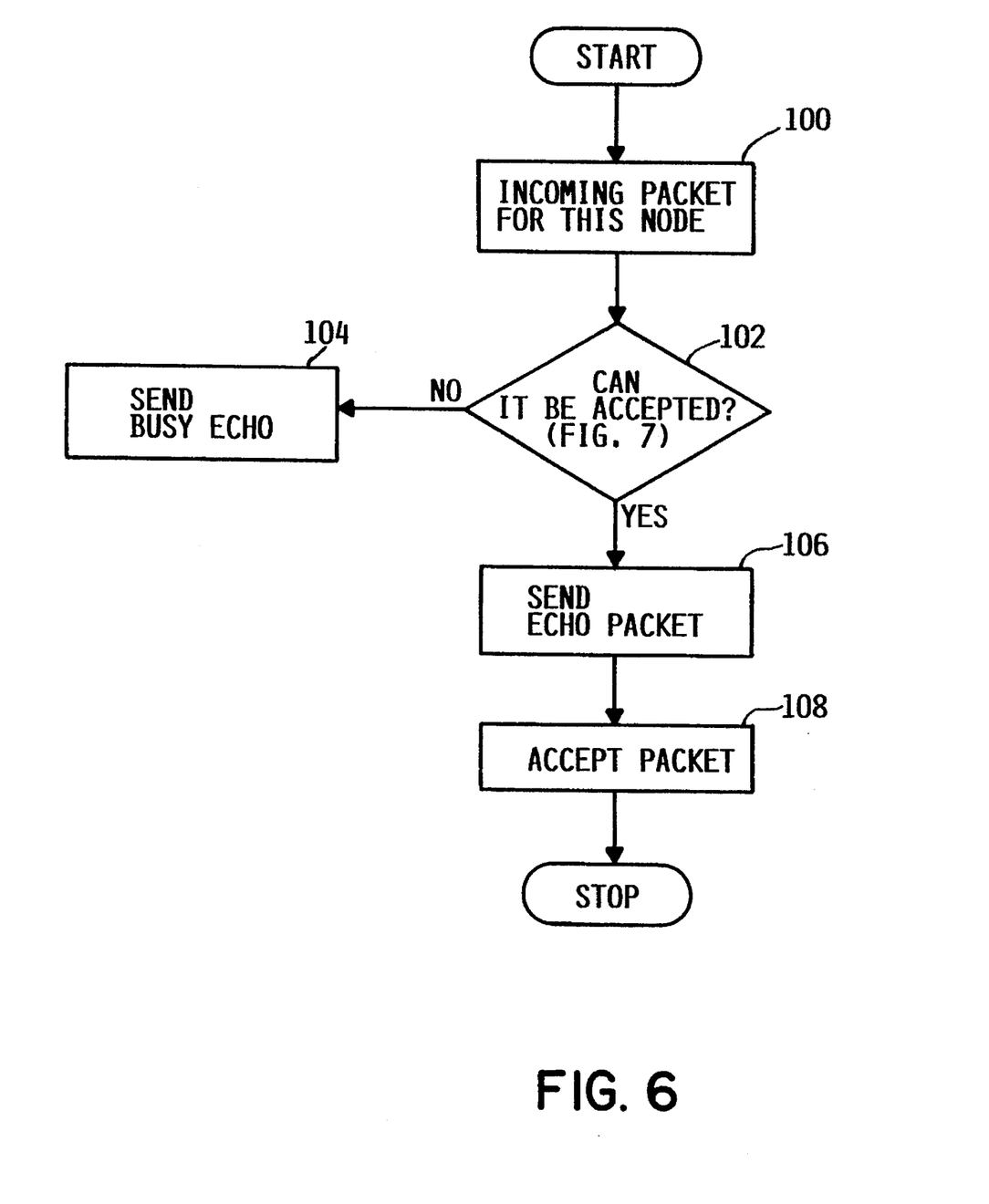
FIG. 6 shows a flowchart that depicts the operation of a control sequencer that is controlling a communications control unit of a destination node.

FIG. 6 shows a flowchart of a routine in communications control unit 26 that receives data packets into a destination agent node in a network. Control sequencer 27 detects an incoming data packet at block 100. At block 102, control sequencer 27 checks whether this data packet can be accepted into a buffer. The check shown in block 102 is performed by control sequencer 27 as further described in FIG. 7. If the incoming data packet cannot be accepted, control sequencer 27 generates a busy echo that is returned to the source or agent node at block 104. If the incoming data packet can be accepted, control sequencer 27 generates a non-busy echo that is returned to the source node at block 106. If the sending node for this data packet was a source node, its receipt of these echoes is shown at block 53 of FIG. 4. If the sending node for this data packet was an agent node, its receipt of these echoes is shown at block 83 in FIG. 5.

FIGS. 7–11 show the states, stimuli, state transition, and flowcharts for a finite state machine in control sequencer 27 executing at a receiving node (which may be an agent or destination node) that checks whether a packet can be received at the receiving node.

Figure 7:
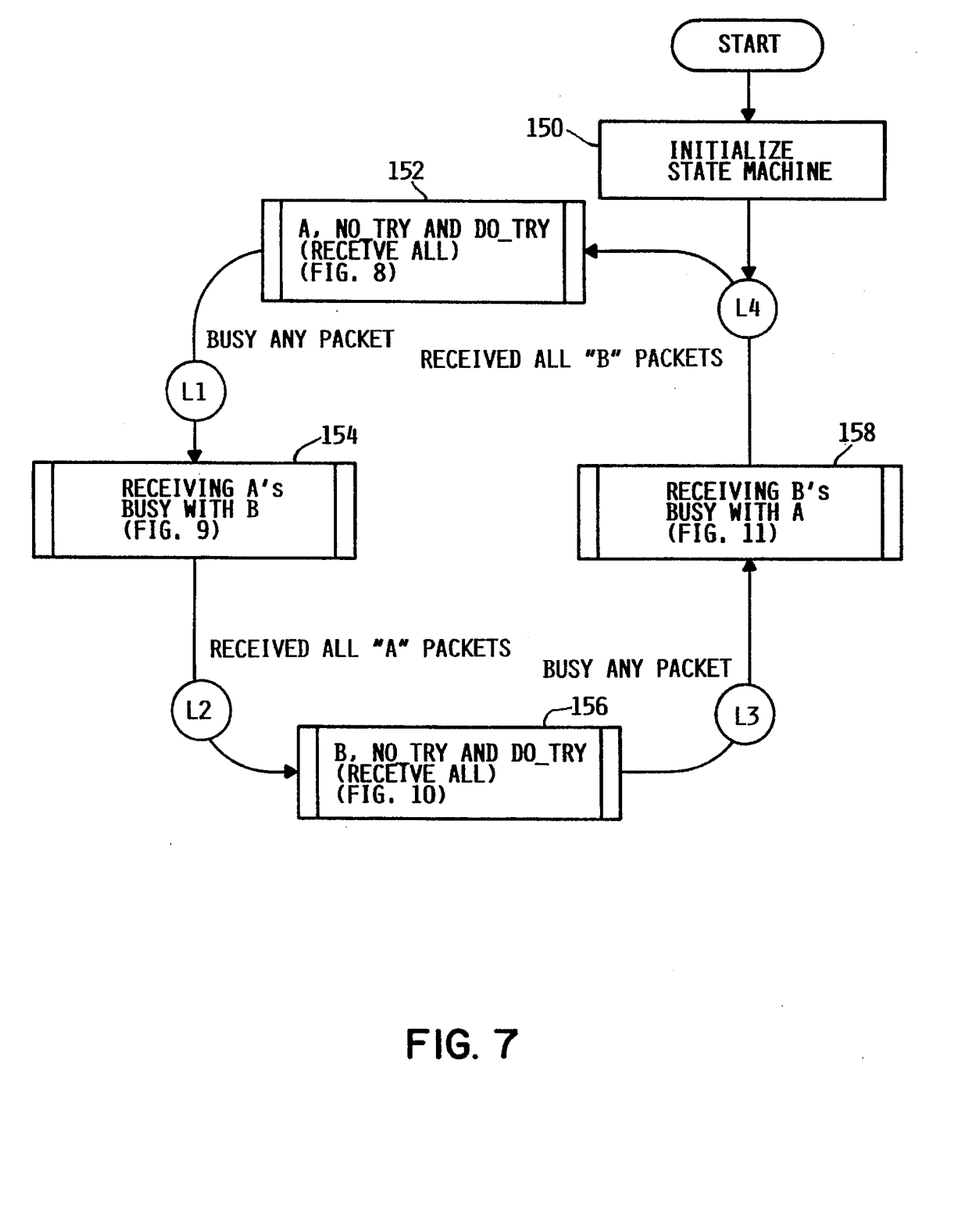
FIGS. 7–11 depict the states, state transitions, and stimuli that describe an example of the operation of a control sequencer that is controlling a communications control unit of a receiving node, which may be either an agent or a destination node, in the preferred embodiment.

Referring to FIG. 7, the first time the finite state machine is invoked, control sequencer 27 initializes the finite state machine as shown at block 150, which includes setting A_count and B_count to zero. A_count is the number of packets outstanding with a reservation tag of "A". B_count is the number of echo packets outstanding with a reservation tag of "B". Thereafter, each time the finite state machine is invoked at block 72 of FIG. 5 or block 102 of FIG. 6, the finite state machine will be at one of the states depicted at blocks 152, 154, 156, and 158. Block 152 shows the "receive A, no_try, and do_try" state, which is further described in FIG. 8. Block 154 shows the "receiving A" state, which is further described in FIG. 9. Block 156 shows the "receive B, no_try and do_try state", which is further described in FIG. 10. Finally, block 158 shows the "receiving B" state, further described in FIG. 11.

Figure 8:
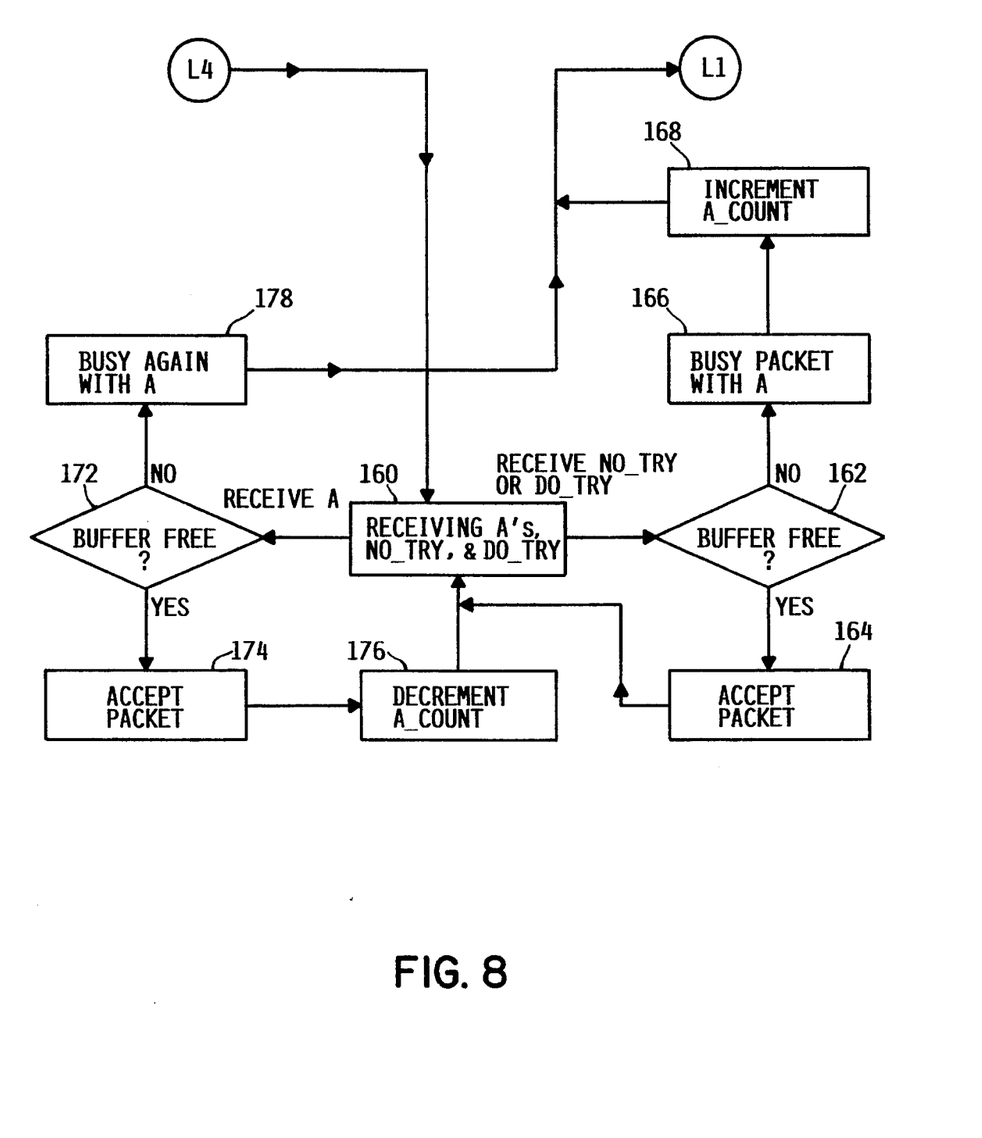

FIG. 8 shows the "receiving A, no_try, & do_try" state and the stimuli, actions, and state transitions that can occur in or from this state. At block 160, control sequencer 27 is in the "receiving A, no_try, & do_try" state. When in this state, control sequencer 27 can either receive a packet with a reservation tag of "A", a packet with a reservation tag of do_try, or a packet with a reservation tag of no_try. No packets with a reservation tag of "B" can arrive. A reservation tag of "A" means that this packet has been previously rejected and given the "A" tag by the receiving node. Do_try and no_try mean that the packet being received is a new packet, not yet rejected by the receiving node. The source node places the tag of no_try or do_try in the packet. Do_try means the source node wants a reservation tag if the packet cannot be accepted. No_try means the source node doesn't want a reservation tag if the packet cannot be accepted.

If control sequencer 27 receives a new packet with a reservation tag of no_try or do_try, it checks to see if the number of its free buffers is greater than zero at block 162. If it has a free buffer, it indicates that the packet is to be accepted into the buffer at block 164. The buffer then will be occupied and will no longer be free. Control sequencer 27 then returns to block 160 and waits for another packet.

If the number of free buffers is not greater than zero, then control sequencer 27 indicates at block 166 that the packet is to have an echo packet returned to the sending node with reservation tag of "A" if the packet had a tag of do_try. If the packet had a tag of no_try then the echo packet is to be returned with a busy indication. Control sequencer 27 increments A_count, the number of packets with reservation tag of "A", at block 168. The finite state machine of control sequencer 27 then leaves the "receiving A, no_try, and do_try" state and enters the "receiving A" state, as described below under the description for FIG. 9.

If control sequencer 27 receives a packet with a reservation tag of "A" while in the "receiving A, no_try, & do_try" state at block 160, it checks to see if the number of its free buffers is greater than zero at block 172. If it has a free buffer, it indicates that the packet is to be accepted into the buffer at block 174. The buffer then will be occupied and will no longer be free. Control sequencer 27 decrements A_count, the number of packets with a reservation tag of "A", at block 176. Control sequencer 27 then returns to block 160 and waits for another packet.

If the number of free buffers is not greater than zero at block 172, then control sequencer 27 indicates that an echo packet is to be once again returned with a reservation tag of "A" at block 178. The finite state machine of control sequencer 27 then leaves the "receiving A, no_try, and do_try" state and enters the "receiving A" state, as described below under the description for FIG. 9.

Figure 9:
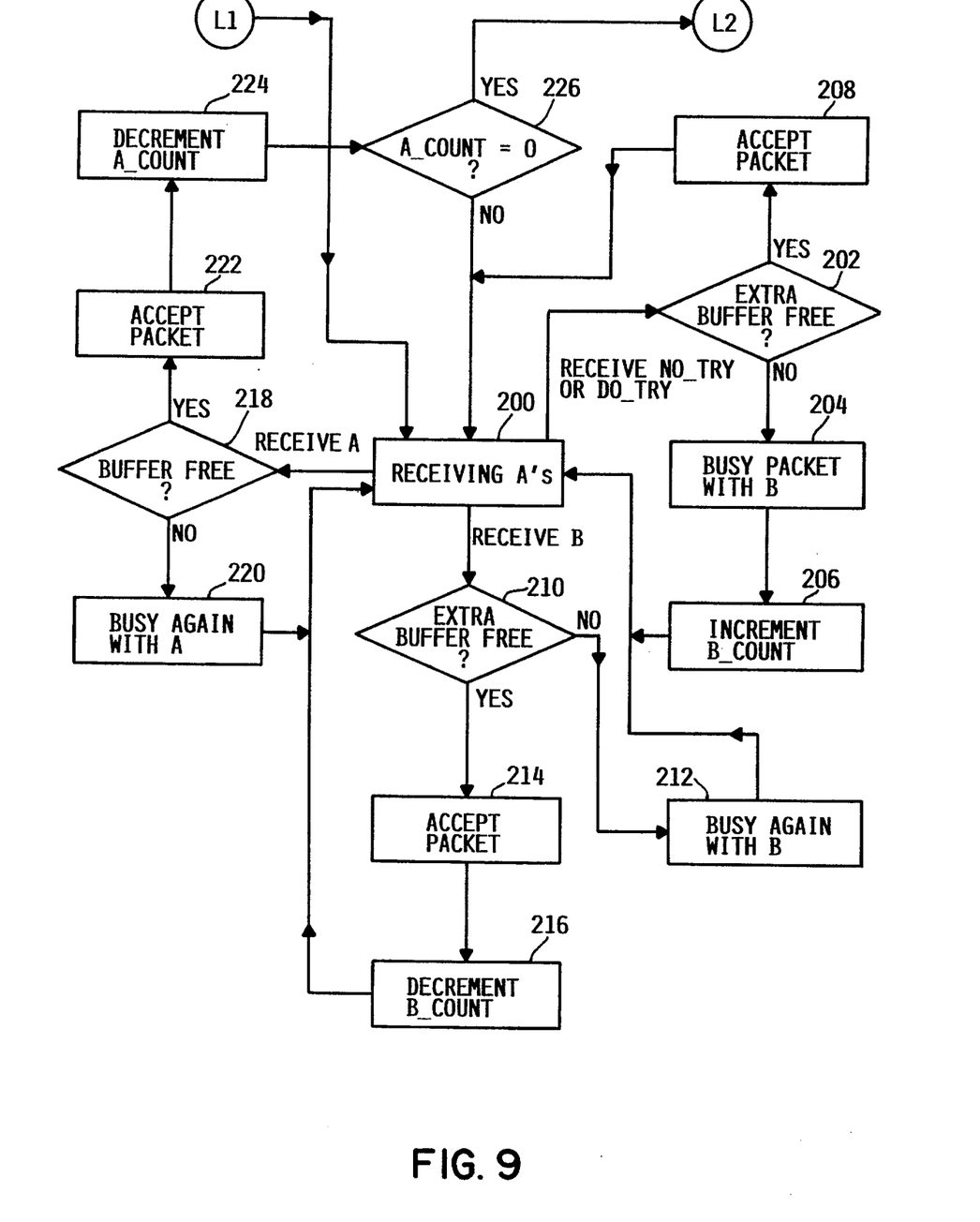

FIG. 9 shows the "receiving A" state and the stimuli, actions, and state transitions that can occur in or from this state. At block 200, control sequencer 27 is in the "receiving A" state. When in this state, control sequencer 27 can either receive a packet with a reservation tag of "A", a packet with a reservation tag of "B", a packet with a reservation tag of do_try, or a packet with a reservation tag of no_try.

If control sequencer 27 receives a new packet with a reservation tag of no_try or do_try, it checks to see if the number of packets outstanding with a reservation tag of "A" is greater than the number of free buffers at block 202. If false, control sequencer indicates at block 204 that the packet is to have an echo packet returned to the sending node with reservation tag of "B" if the packet had a tag of do_try. If the packet had a tag of no_try then the echo packet is to be returned with a busy indication. Control sequencer 27 increments B_count, the number of packets with reservation tag of "B", at block 206. Control sequencer 27 then returns to block 200 and waits for another packet.

If the check at block 202 is true, then control sequencer 27 indicates at block 208 that the packet is to be accepted into a free buffer. The buffer then will be occupied and will no longer be free. Control sequencer 27 then returns to block 200 and waits for another packet.

If control sequencer 27 receives a reservation tag of "B", it checks to see if the number of packets outstanding with a reservation tag of "A" is greater than the number of free buffers at block 210. If false, control sequencer indicates at block 212 that the packet is to have another busy echo packet returned to the sending node with reservation tag of "B". Control sequencer 27 then returns to block 200 and waits for another packet.

If the check at block 210 is true, then control sequencer 27 indicates at block 214 that the packet is to be accepted into a free buffer. The buffer then will be occupied and will no longer be free. Control sequencer 27 then decrements B_count, the number of packets outstanding with a reservation tag of "B" at block 216. Control sequencer 27 then returns to block 200 and waits for another packet.

If control sequencer 27 receives a reservation tag of "A", it checks at block 218 whether the number of free buffers is greater than zero. If the number of free buffers is not greater than zero, then control sequencer 27 indicates at block 220 that the packet is to have a busy echo packet returned to the sending node with reservation tag of "A". Control sequencer 27 then returns to block 200 and waits for another packet.

If the number of free buffers is greater than zero at block 218, then control sequencer 27 indicates at block 222 that the packet is to be accepted into a free buffer, which then will become occupied. A_count, the number of packets outstanding with a reservation tag of "A" is decremented by control sequencer 27 at block 224 and checked by control sequencer 27 at block 226. If A_count does not equal zero, control sequencer returns to block 200 and waits for another packet. If A_count equals zero, control sequencer 27 leaves the "receiving A" state and enters the "receiving B, no_try, & do_try" state, which is described below under the description for FIG. 10.

Figure 10:
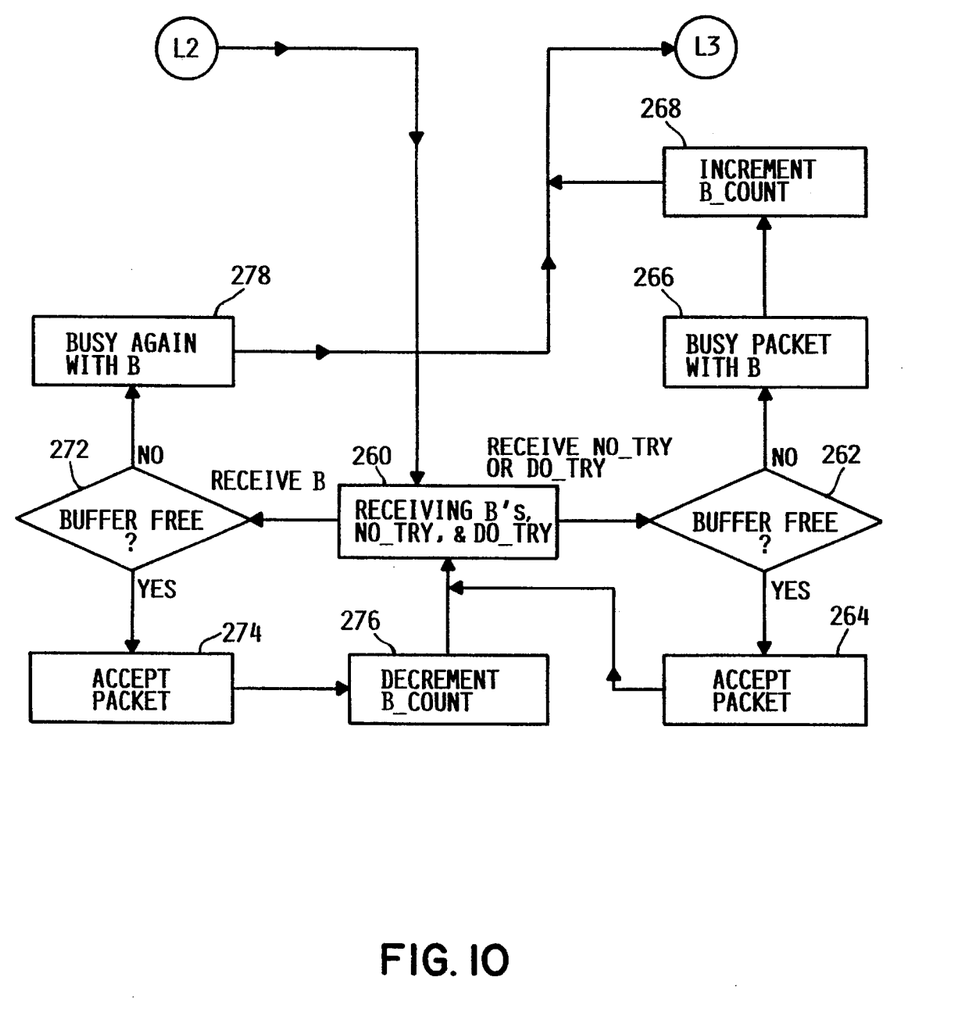

FIG. 10 shows the "receiving B, no_try, & do_try" state and the stimuli, actions, and state transitions that can occur in or from this state. At block 260, control sequencer 27 is in the "receiving B, no_try, & do_try" state. When in this state, control sequencer 27 can either receive a packet with a reservation tag of "B", a packet with a reservation tag of do_try, or a packet with a reservation tag of no_try. No packets with a reservation tag of "A" can arrive. A reservation tag of "B" means that this packet has been previously rejected and given the "B" tag by the receiving node.

If control sequencer 27 receives a new packet with a reservation tag of no_try or do_try, it checks to see if the number of its free buffers is greater than zero at block 262. If it has a free buffer, it indicates that the packet is to be accepted into the buffer at block 264. The buffer then will be occupied and will no longer be free. Control sequencer 27 then returns to block 260 and waits for another packet.

If the number of free buffers is not greater than zero, then control sequencer 27 indicates at block 266 that the packet is to have an echo packet returned to the sending node with reservation tag of "B" if the packet had a tag of do_try. If the packet had a tag of no_try then the echo packet is to be returned with a busy indication. Control sequencer 27 increments B_count, the number of packets with reservation tag of "B", at block 268. The finite state machine of control sequencer 27 then leaves the "receiving B, no_try, and do_try" state and enters the "receiving B" state, as described below under the description for FIG. 11.

If control sequencer 27 receives a packet with a reservation tag of "B" while in the "receiving B, no_try, & do_try" state at block 260, it checks to see if the number of its free buffers is greater than zero at block 272. If it has a free buffer, it indicates that the packet is to be accepted into the buffer at block 274. The buffer then will be occupied and will no longer be free. Control sequencer 27 decrements B_count, the number of packets with a reservation tag of "B", at block 276. Control sequencer 27 then returns to block 260 and waits for another packet.

If the number of free buffers is not greater than zero at block 272, then control sequencer 27 indicates that an echo packet is to be once again returned with a reservation tag of "B" at block 278. The finite state machine of control sequencer 27 then leaves the "receiving B, no_try, and do_try" state and enters the "receiving B" state, as described below under the description for FIG. 11.

Figure 11:
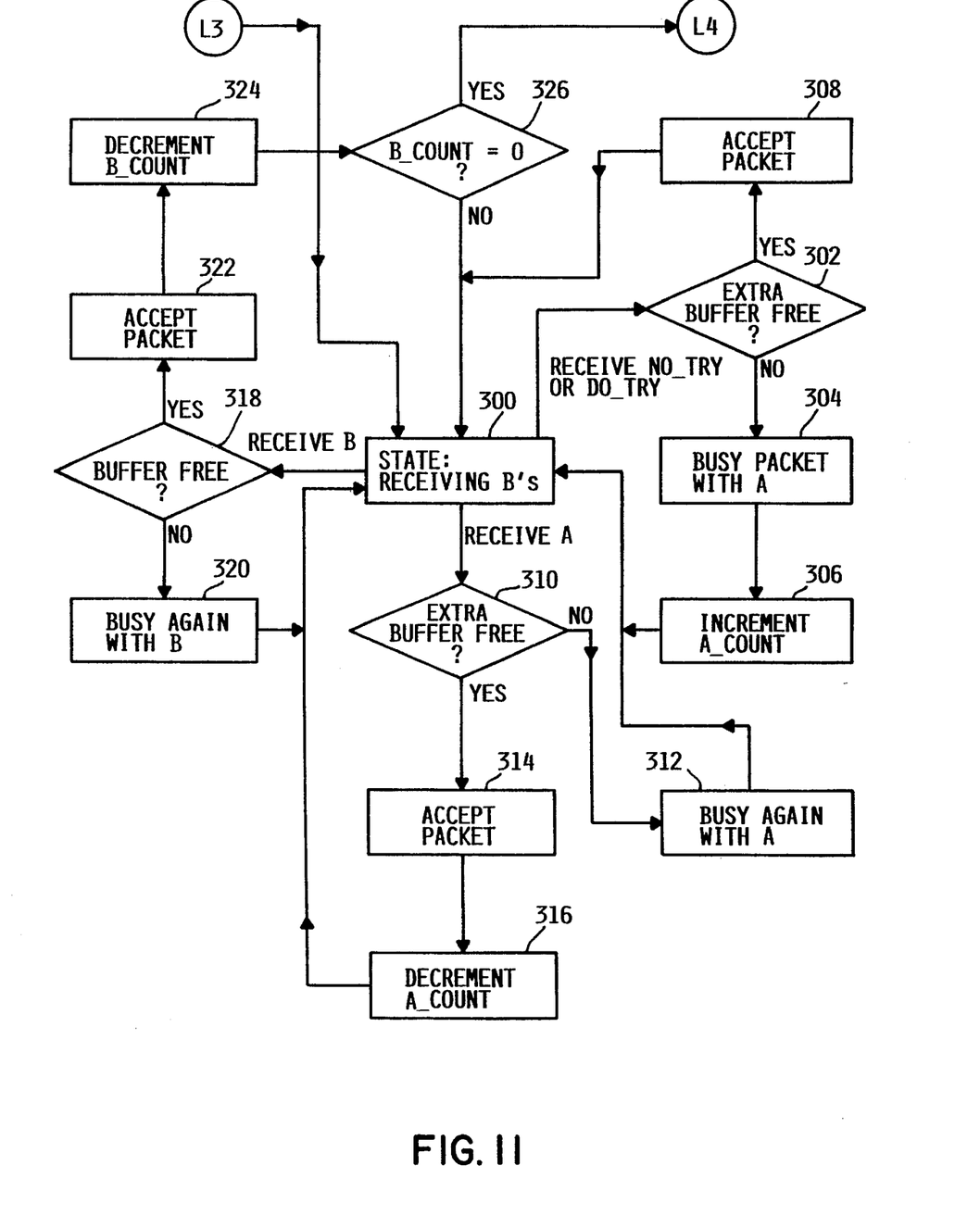

FIG. 11 shows the "receiving B" state and the stimuli, actions, and state transitions that can occur in or from this state. At block 300, control sequencer 27 is in the "receiving B" state. When in this state, control sequencer 27 can either receive a packet with a reservation tag of "A", a packet with a reservation tag of "B", a packet with a reservation tag of do_try, or a packet with a reservation tag of no_try.

If control sequencer 27 receives a new packet with a reservation tag of no_try or do_try, it checks to see if the number of packets outstanding with a reservation tag of "B" is greater than the number of free buffers at block 302. If false, control sequencer indicates at block 304 that the packet is to have an echo packet returned to the sending node with reservation tag of "A" if the packet had a tag of do__try. If the packet had a tag of no__try then the echo packet is to be returned with a busy indication. Control sequencer 27 increments A__count, the number of packets with reservation tag of "A", at block 306. Control sequencer 27 then returns to block 300 and waits for another packet.

If the check at block 302 is true, then control sequencer 27 indicates at block 308 that the packet is to be accepted into a free buffer. The buffer then will be occupied and will no longer be free. Control sequencer 27 then returns to block 300 and waits for another packet.

If control sequencer 27 receives a reservation tag of "A", it checks to see if the number of packets outstanding with a reservation tag of "B" is greater than the number of free buffers at block 310. If false, control sequencer indicates at block 312 that the packet is to have another busy echo packet returned to the sending node with reservation tag of "A". Control sequencer 27 then returns to block 300 and waits for another packet.

If the check at block 310 is true, then control sequencer 27 indicates at block 314 that the packet is to be accepted into a free buffer. The buffer then will be occupied and will no longer be free. Control sequencer 27 then decrements A__count, the number of packets outstanding with a reservation tag of "A" at block 316. Control sequencer 27 then returns to block 300 and waits for another packet.

If control sequencer 27 receives a reservation tag of "B", it checks at block 318 whether the number of free buffers is greater than zero. If the number of free buffers is not greater than zero, then control sequencer 27 indicates at block 320 that the packet is to have a busy echo packet returned to the sending node with reservation tag of "B". Control sequencer 27 then returns to block 300 and waits for another packet.

If the number of free buffers is greater than zero at block 318, then control sequencer 27 indicates at block 322 that the packet is to be accepted into a free buffer, which then will become occupied. B__count, the number of packets outstanding with a reservation tag of "B" is decremented by control sequencer 27 at block 324 and checked by control sequencer 27 at block 326. If B__count does not equal zero, control sequencer returns to block 300 and waits for another packet. If B__count equals zero, control sequencer 27 leaves the "receiving B" state and enters the "receiving A, no__try, & do__try" state, which is described above under the description for FIG. 8.

While this invention has been described with respect to the preferred and alternative embodiments, it will be understood by those skilled in the art that various changes in detail may be made therein without departing from the spirit, scope, and teaching of the invention. For example, although SCI standard specifies unidirectional rings, the invention could work equally well in a shared bus. Also, although the example described has an "A" and a "B" priority, additional priorities could be used. Accordingly, the herein disclosed invention is to be limited only as specified in the following claims.

What is claimed is:

1. An apparatus for receiving data packets in a receiving node of a data processing network, said network comprising a plurality of nodes and a transmission medium for transmitting data packets among said nodes, said receiving node having a plurality of buffers for receiving data packets, each buffer of said plurality of buffers being in one of a free state, wherein said buffer is capable of receiving a data packet, and an occupied state, wherein said buffer is incapable of receiving a data packet, said receiving node issuing one or more reservation tokens to one or more sending nodes of said network for association with data packets being transmitted by said sending nodes, each said reservation token having an associated priority, said apparatus comprising:

means for detecting the presence of a first data packet being transmitted on said transmission medium from a first sending node;

means for determining whether the number of said buffers for receiving data packets in said receiving node being in said free state exceeds the number of outstanding reservation tokens having at least a first priority;

means for receiving said data packet into one of said buffers being in a free state if said determining means determines that the number of said buffers being in said free state exceeds the number of outstanding reservation tokens having at least said first priority; and means for issuing said reservation token having a second priority lower than said first priority for association with said data packet if said determining means determines that the number of said buffers being in said free state does not exceed the number of outstanding reservation tokens having at least said first priority.

2. The apparatus of claim 1, wherein said data processing network further comprises a multi-segment network having at least first and second segments wherein communication of said data packets from a source node in said first segment to a destination node in said second segment is provided by an agent node, and wherein said receiving node is said agent node.

3. The apparatus of claim 1, wherein said plurality of nodes are arranged in at least first and second segments, and wherein said plurality of nodes further comprise a source node in said first segment, a destination node in said second segment, and an agent node that provides communication of said data packets from said source node to said destination node, and wherein said receiving node is said destination node.

4. The apparatus of claim 1, wherein said plurality of nodes are arranged in a plurality of interconnected rings.

5. The apparatus of claim 1, wherein said network further comprises a star network.

6. A method for receiving data packets in a receiving node of a data processing network, said network comprising a plurality of nodes and a transmission medium for transmitting data packets among said nodes, said receiving node having a plurality of buffers for receiving data packets, each buffer of said plurality of buffers being in one of a free state, wherein said buffer is capable of receiving a data packet, and an occupied state, wherein said buffer is incapable of receiving a data packet, said receiving node issuing one or more reservation tokens to one or more sending nodes of said network for association with data packets being transmitted by said sending nodes, each said reservation token having an associated priority, said apparatus comprising:

detecting the presence of a first data packet being transmitted on said transmission medium from a first sending node;

determining whether the number of said buffers for receiving data packets in said receiving node being in said free state exceeds the number of outstanding reservation tokens having at least a first priority;

receiving said data packet into one of said buffers being in a free state if said determining step determines that the number of said buffers being in said free state exceeds the number of outstanding reservation tokens having at least said first priority; and issuing said reservation token having a second priority lower than said first priority for association with said data packet if said determining step determines that the number of said buffers being in said free state does not exceed the number of outstanding reservation tokens having at least said first priority.

7. The method of claim 6, wherein said data processing network further comprises a multi-segment network having at least a first and second segments wherein communication of said data packets from a source node in said first segment to a destination node in said second segment is provided by an agent node, and wherein said receiving node is said agent node.

8. The method of claim 6, wherein said plurality of nodes are arranged in at least first and second segments, and wherein said plurality of nodes further comprise a source node in said first segment, a destination node in said second segment, and an agent node that provides communication of said data packets from said source node to said destination node, and wherein said receiving node is said destination node.

9. The method of claim 6, wherein said plurality of nodes are arranged in a plurality of interconnected rings.

10. The method of claim 6, wherein said network further comprises a star network.

11. A computer program product for use in a computer system having a processor, said computer program product being adapted for receiving data packets in a receiving node of a data processing network, said network comprising a plurality of nodes and a transmission medium for transmitting data packets among said nodes, said receiving node having a plurality of buffers for receiving data packets, each buffer of said plurality of buffers being in one of a free state, wherein said buffer is capable of receiving a data packet, and an occupied state, wherein said buffer is incapable of receiving a data packet, said receiving node issuing one or more reservation tokens to one or more sending nodes of said network for association with data packets being transmitted by said sending nodes, each said reservation token having an associated priority, said computer program product comprising:

a recording medium;

means, recorded on said recording medium, for detecting the presence of a first data packet being transmitted on said transmission medium from a first sending node;

means, recorded on said recording medium, for determining whether the number of said buffers for receiving data packets in said receiving node being in said free state exceeds the number of outstanding reservation tokens having at least a first priority;

means, recorded on said recording medium, for receiving said data packet into one of said buffers being in a free state if said determining means determines that the number of said buffers being in said free state exceeds the number of outstanding reservation tokens having at least said first priority; and means, recorded on said recording medium, for issuing said reservation token having a second priority lower than said first priority for association with said data packet if said determining means determines that the number of said buffers being in said free state does not exceed the number of outstanding reservation tokens having at least said first priority.

\* \* \* \* \*